Figure 1:
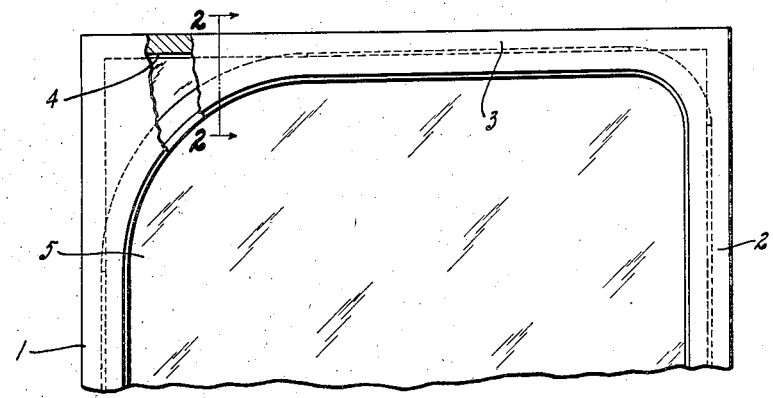

July 24, 1934.  J. S. REID  1,967,514

CHANNEL

Original Filed Feb. 19, 1932

INVENTOR
James S. Reid
BY
Brockett, Hyde, Higley & Meyer
ATTORNEYS

Patented July 24, 1934

1,967,514

UNITED STATES PATENT OFFICE 1,967,514

CHANNEL

James S. Reid, Shaker Heights, Ohio, assignor to The Reid Products Company, Cleveland, Ohio, a corporation of Ohio Original application February 19, 1932, Serial No. 594,040. Divided and this application August 23, 1933, Serial No. 686,428

3 Claims. (Cl. 296—44.5)

The invention disclosed in this application relates to window structures for vehicles and has particular reference to the glass run channel arrangement, the present application being a division of my copending application for Channels, application Ser. No. 594,040, filed February 19, 1932.

One object of the invention is to produce a window structure for sliding glass panes where one or both of the upper corners of the window opening are curved, or other than right angled, and to arrange a glass run channel in the window groove thereof so that the exposed edges of the channel are continuous with the curved edges of the window opening throughout the side and top without interfering with free movement of the square corners of the window pane up into the curve at the corners.

Another object of the invention is to provide a channel core of skeleton type wherein a blank of spring-like material, such as spring steel or the like, is punched out or slotted to provide spaced longitudinal straps, each near but within the edge of the strip, and the two straps being connected by transverse diagonally disposed portions which join along the median line and are adapted to form transverse U-shaped strips when the core is fabricated into U-shaped channel. Outwardly beyond the longitudinal straps diagonally extending spaced tongues are provided, each being located opposite the end of one of the transverse strips. When a blank is formed in this way a substantially U-shaped channel structure made up of transverse straps is provided and the longitudinal straps may be rolled over into open round beads with the tongues extending inward and downward towards the base of the channel to form cores for lip pads. In this way the U-shaped channel structure fits the window groove, the open beads extending above the edge to mask the lip pads and the lugs receive lip pads which engage the glass. By this construction the lip pads are yielding and the beads augment this yielding characteristic.

Another feature of the invention is the modification of the skeleton core blank just described by forming a multiplicity of W-shaped transverse core strips, each including short straight portions corresponding to the position of the aforesaid longitudinal straps and located within but near the ends of the W-shaped cross strips and spaced apart by diagonally extending V-shaped portions meeting at the median line and outer end tongue portions extending diagonally and adapted to form the lip pad core. These transverse strips are ganged in spaced relation with respect to each other, and to the straight portions thereof are secured, as by spot welding, longitudinal straps which ultimately form the rolled finishing beads or strips.

Other features of the invention will be obvious from the following description, drawing and claims.

Figure 2:
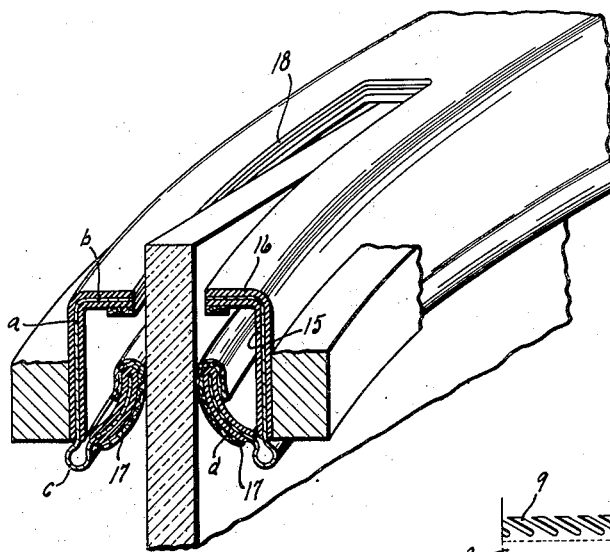
Figure 3:
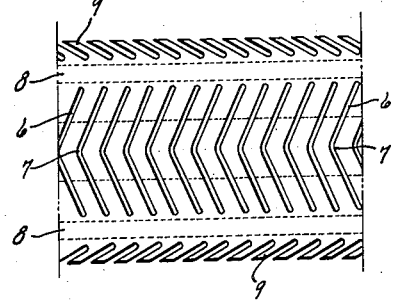

Referring to the drawing, Fig. 1 is a side elevation of the upper portion of a window having curved upper corners at the window opening; Fig. 2 is a sectional perspective view of a portion of an upper corner, with the section taken upon the line 2—2 of Fig. 1; Fig. 3 is a plan view of one form of core blank; and Fig. 4 is a modified form of the blank.

In the embodiment shown in Fig. 1, 1 and 2 represent the two vertical sides of the window frame connected by an upper horizontal member 3. These members are channeled out to form a window groove, generally indicated at 4. This groove is continuous throughout the sides and the top. It also extends down into the lower portion of the door below the window opening so that the glass may slide therein. The grooves at the sides form the runway for the glass pane 5 which is rectangular, as shown, with parallel side edges and a horizontal upper edge, the corners being right angled. The glass is wide enough so that it extends into the window grooves, as shown, and it may be raised so that it extends into that portion of the window groove in the upper member 3. The construction of the door and window just described is very prevalent in automobile designs at the present time and one feature of the present invention is the adaptation of glass run channel to the window grooves of a window of this type so that said channel may be bent around the corners with the finishing strips or beads of the channel exposed uniformly and continuously along the outer edges of both sides of the window groove.

The channel is generally of U-shape in cross section with inwardly and downwardly extending lip pads, and is made up in the following manner. In the construction shown in Fig. 3, the core is made of a ribbon of spring-like material, such as spring steel. It is formed with diagonally disposed slots 6 meeting at the center 7 and terminating adjacent longitudinal strap portions 8 extending along both sides within but near the edges. Beyond these strap portions are diagonally disposed lip pad tongues or lugs 9 spaced apart and extending diagonally, as do the slots 6. By the provision of these lugs and the inner transverse strips formed by the slots 6, a core is provided including spaced longitudinally disposed parallel straps connected to each other by diagonally disposed transverse strip portions spaced apart and meeting at the median line. These strips form the sides *a* and base *b* of the formed channel. The longitudinal straps 8 are bent into the open beads, indicated at *c*, while the lugs 9 form the inwardly and downwardly extending cores *d* carrying the lip pads, as will appear.

Figure 4:
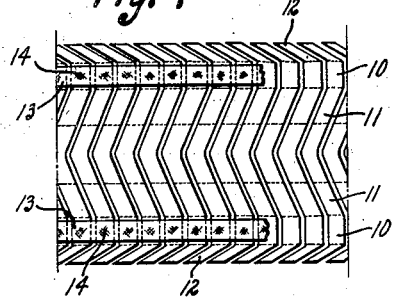

The blank shown in Fig. 3 may be made up in the modified form shown in Fig. 4, comprising a multiplicity of like separate transverse strips including straight portions 10, inner diagonal strip portions 11 connected together at the median line and outer lip pad core lugs 12 arranged diagonally and extending in the same direction as the inner portions 11. These strips are more or less of W-form and they are laid in spaced relation, as shown in Fig. 4, and are secured together by separate longitudinal straps 13 spot welded or otherwise secured, as at 14, to each of the straight portions 10. This form of core is fabricated to channel form in the same manner as that shown in Fig. 3, by shaping it so that the inner diagonal portions 11 form the base *b* and the side flanges *a*, with the longitudinal straps 13 forming the open finishing beads *c*, and the lugs 12 forming the lip pad cores *d*.

The core in flat form, in either of the forms shown in Figs. 3 and 4, is passed through any suitable form of rubber extruding machine and is thereby provided with a continuous coating of rubber or any suitable like material extending over the entire core. In other words, this rubber coating is continuous over both surfaces and around the edges of the flat strip and of course it extends through all slots and openings so as to bind the coating on each surface to that on the other surface. Next, the edges or lip portions are enclosed with a layer of surface material, such as felt or the like, as indicated at 17, such material being firmly bound to the body by the adhesive characteristics of the rubber coating. Either before or after application of this felt layer, the rubber coating is removed from both surfaces of the longitudinal continuous strap portions 8 in Fig. 3 and 10, 13 in Fig. 4. Thereupon, the coated strip is passed through a suitable forming machine and is bent up into the cross sectional form shown in Fig. 2. This operation forms the uncoated longitudinal straps into rolled beads *c*, the transverse strip portions into the sides and bottom of the channel and the edge portions or tongues 12 into the glass engaging lip pad members, so that the channel as a whole can be introduced into the window groove for guiding the glass therein.

Inasmuch as the base and side flanges of the channel are formed by the V-shaped transverse strips, they provide a herring-bone construction with the central points, indicated at 7, Fig. 3, extending longitudinally and with the lip pad core lugs extending in the same direction so that when the channel is complete it may be freely bent around curves such as are shown at the upper lefthand corner of the window illustrated in Fig. 1. When the channel is so bent, the lip pad core lugs and the transverse strips spread to permit such an arrangement; at the same time the finishing beads *c* nest along the edges of the window grooves and are forced tightly thereagainst by the tension on the lip pads when the glass is in place.

In order to provide for the square corners of the glass at the rounded corners of the window opening, the base of the channel is cut away, as at 18, to permit the projecting glass corner to extend therethrough. In this way the glass may be moved up to its ultimate upper position and yet the glass run channel may be laid or applied in its proper position at the edges of the window opening.

What I claim is:

1. A core for glass run channel, comprising a pair of open beads, a plurality of spaced U-shaped strips connecting the outer edges of said beads, a plurality of inwardly and downwardly extending spaced lugs carried by the inner edge of each bead to provide a core for a lip pad, the spaces between the lugs and the spaces between the strips serving to permit flexing of the channel core in the adaptation of the finished product to window grooves of various shaped windows.

2. A core for glass run channel as in claim 1, wherein each of the U-shaped transverse strips comprises two portions extending diagonally from the median line with a consequent herringbone effect.

3. A window runway comprising a channel member of substantially rigid sheet material arranged to receive a sliding glass sash and formed to provide one-piece channel shaped portions extending angularly with respect to each other, and a one-piece channel shaped intermediate portion integral with said angularly disposed portions, said intermediate portion providing a corner of a window opening.

JAMES S. REID.